(12) United States Patent
Atlaw et al.

(10) Patent No.: US 9,204,757 B2
(45) Date of Patent: Dec. 8, 2015

(54) ADJUSTABLE PITCH COOKING GRATE

(71) Applicant: Yohannes Atlaw, Fremont, CA (US)

(72) Inventors: Yohannes Atlaw, Fremont, CA (US); John Andrew Moulds, Encinitas, CA (US); Jeffery Mullally, La Mesa, CA (US)

(73) Assignee: Yohannes Atlaw, Fremont, CA (US)

( * ) Notice: Subject to any disclaimer, the term of this patent is extended or adjusted under 35 U.S.C. 154(b) by 0 days.

(21) Appl. No.: 14/180,812

(22) Filed: Feb. 14, 2014

(65) Prior Publication Data
US 2014/0230666 A1 Aug. 21, 2014

Related U.S. Application Data

(60) Provisional application No. 61/766,587, filed on Feb. 19, 2013.

(51) Int. Cl.
*A47J 37/06* (2006.01)
*A47J 37/07* (2006.01)

(52) U.S. Cl.
CPC .......... *A47J 37/0786* (2013.01); *A47J 37/0694* (2013.01)

(58) Field of Classification Search
CPC . A47J 37/067; A47J 37/0786; A47J 37/0763; A47J 37/0694; A47J 37/0704; A47J 33/00
USPC ........ 99/393, 449, 450, 444, 447; 126/152 B, 126/152 R, 153, 161, 172, 9 R; 160/159, 160/160, 162
See application file for complete search history.

(56) References Cited

U.S. PATENT DOCUMENTS 1,337,043 A * 4/1920 Child ........................ 99/443 R
2,001,181 A * 5/1935 Burcham ...................... 160/159
(Continued)

FOREIGN PATENT DOCUMENTS

| AU | 750958 B2 | 8/2002 |
| JP | 2011254955 A | 12/2011 |
| RU | 113126 U1 | 2/2012 |

OTHER PUBLICATIONS

"PCT International Search Report and the Written Opinion of the International Search Authority, or the Declaration" for PCT/US 2014/016948 (ISR erroneously shows "PCT/US 2014/016946", mailed Jun. 19, 2014, 6 pages.

*Primary Examiner* — Dana Ross
*Assistant Examiner* — James Sims, III
(74) *Attorney, Agent, or Firm* — Haynes Beffel & Wolfeld LLP; James F. Hann

(57) ABSTRACT

An adjustable pitch cooking grate includes generally parallel rods and means for changing the pitch of the rods by moving the rods between a closed configuration and a range of open configurations, with different width gaps therebetween. Scissors linkage at the rod ends can move the rods in unison between the open and close configurations. When the rods have flat upper surfaces the rods create a generally flat, smooth, continuous cooking surface when in the closed configuration and a plurality of generally flat coplanar cooking surfaces when in the different open configurations. The pitch changing means can include manual or motorized means for moving the rods between the open and close configurations. The spacing between the rods in a fully open configuration can be equal to about 1-3 times the lateral dimension of the rods. One or more cooking grates can be supported by the cooking grill frame.

17 Claims, 12 Drawing Sheets

(56) References Cited

U.S. PATENT DOCUMENTS

| | | | |
|---|---|---|---|
| 3,149,623 A * | 9/1964 | Orr, Jr. | 126/9 R |
| 3,288,050 A | 11/1966 | Saiki | |
| 3,811,376 A * | 5/1974 | Mills | 99/427 |
| 4,553,523 A | 11/1985 | Stohrer, Jr. | |
| 4,703,746 A | 11/1987 | Hitch | |
| 5,355,868 A | 10/1994 | Haen | |
| 5,437,221 A | 8/1995 | Schwod | |
| 6,016,741 A | 1/2000 | Tsai et al. | |
| 6,314,868 B1 * | 11/2001 | Christensen et al. | 99/340 |
| 6,448,542 B2 * | 9/2002 | Wong et al. | 219/732 |
| 6,945,160 B2 | 9/2005 | Christensen et al. | |
| 2008/0287052 A1 * | 11/2008 | Cook et al. | 454/256 |
| 2009/0173332 A1 * | 7/2009 | Lott | 126/153 |
| 2010/0132689 A1 * | 6/2010 | Contarino, Jr. | 126/25 B |
| 2010/0242943 A1 | 9/2010 | Laporta et al. | |
| 2011/0132205 A1 * | 6/2011 | Brown | 99/450 |

\* cited by examiner

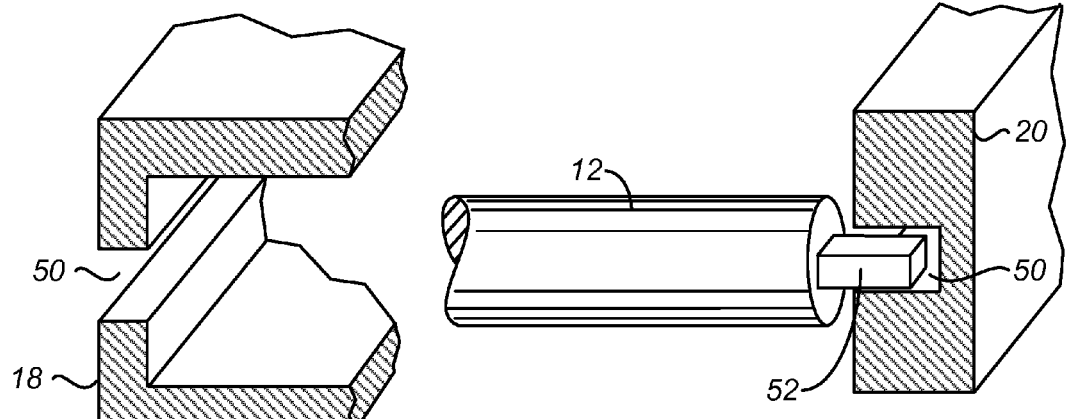
FIG. 8
FIG. 9
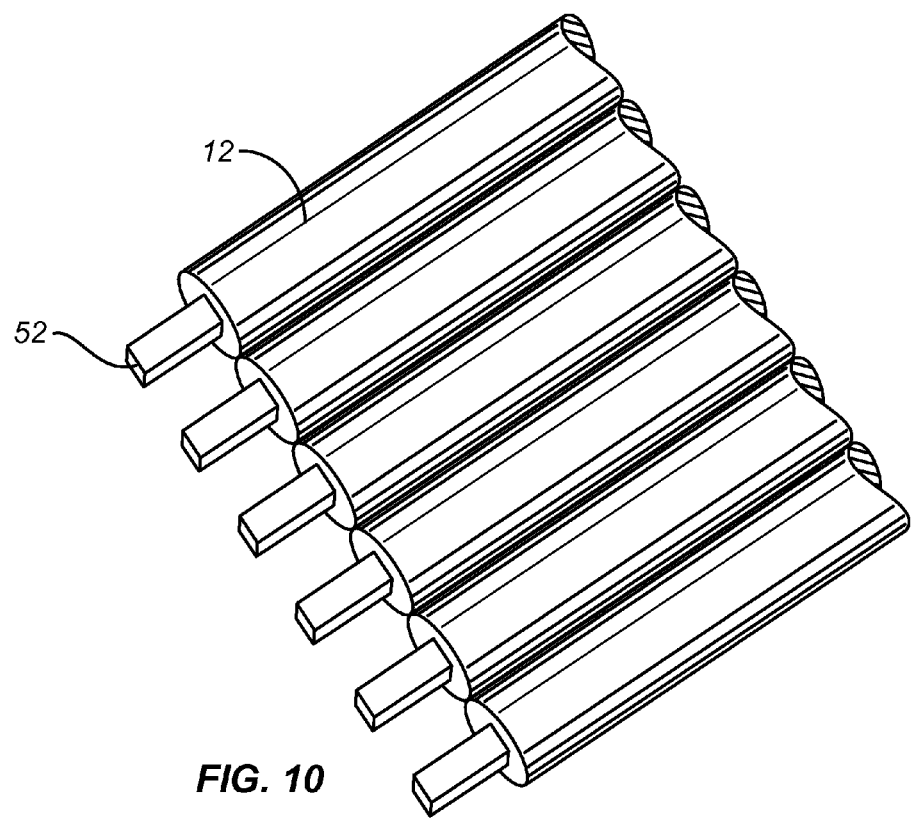
FIG. 10

ADJUSTABLE PITCH COOKING GRATE

CROSS-REFERENCE TO OTHER APPLICATIONS

This application claims the benefit of U.S. provisional patent application No. 61/766,587, filed 19 Feb. 2013.

BACKGROUND OF THE INVENTION

Cooking grates are often used when cooking on a gas or charcoal briquette barbecue cooking grill, as well as gas or electric ovens and cook stoves. One of the problems with conventional cooking grates is that the space between the bars can let excessive amount of heat escape up between the bars of the cooking grate. Another disadvantage is that some foods, such as fish, have a tendency to fall apart during cooking and can fall between the bars. Cooking grates can be used when the heat is supplied from below, from above or from both above and below the cooking grate using radiant heat, heated air or a combination.

BRIEF SUMMARY OF THE INVENTION

A first example of an adjustable pitch cooking grate includes a plurality of generally parallel rods and means for changing the pitch of the rods by moving the rods between a closed configuration, with the rods adjacent to one another, and in a plurality of open configurations at a plurality of pitches, with a plurality of different width gaps between the rods. Examples of the adjustable pitch cooking grate can include one or more the following. The pitch changing means can include first and second scissors linkage operably coupling first and second rows of rod ends, respectively. The pitch changing means can move the rods between the closed configuration and the plurality of open configurations in unison. When the rods have flat upper surfaces the rods create a generally flat, generally smooth, generally continuous cooking surface when in the closed configuration and a plurality of generally flat coplanar cooking surfaces when in the plurality of open configurations. The pitch changing means can include means for manually moving the rods between the open and closed configurations or motorized means for automatically moving the rods between the open and close configurations. The spacing between the rods in a fully open configuration can be equal to about 1-3 times the lateral dimension of the rods.

A second example of an adjustable pitch cooking grate includes a plurality of generally parallel rods having first and second rows of rod ends. The rods are in coupled to one another to be placeable in a closed configuration with the rods at a first pitch and adjacent to one another, and in a plurality of open configurations at a plurality of pitches defining a plurality of different width gaps between the rods. In some examples first and second scissors linkage can be used to operably couple the first and second rows of rod ends, respectively, to permit the rods to be placeable in unison in an the open and close configurations.

A cooking grill includes the first example of the adjustable pitch cooking grate and a frame supporting the adjustable pitch cooking grate. Examples of the cooking grill can include one or more the following. A second adjustable pitch cooking grate can be supported by the frame. The pitch changing means can include first and second scissors linkage operably coupling the ends of the rods. The pitch changing means can include spring elements operably coupling adjacent ones of the rods and biasing the rods away from one another, and a rod drive assembly. The rod drive assembly can include a movable drive element engageable with at least one of the rods and a driver. The driver can be mounted to the frame and operably connected to the drive element to move the drive element towards an end of the frame thereby causing the at least one of the rods to move towards the end of the frame against the biasing force of the springs. The frame can have slots for receiving the first and second ends of the rods.

A method for supporting food while cooking the food is carried out as follows. A desired spacing between the parallel rods of a cooking grate supported by a frame is determined, the rods supporting food during cooking The cooking grate defines a cooking grate plane. The rods have a length and a lateral dimension measured perpendicular to their length and parallel to the cooking grate plane. The pitch of the rods of the cooking grate is changed when needed to achieve the desired spacing between the rods. Examples of the method can include one or more the following. A revised desired spacing can be determined between the rods of the cooking grate, and the pitch of the rods of the cooking grate can be simultaneously changed to achieve the revised desired spacing. The desired spacing and revised desired spacing are in the range of about 0-3 times the lateral dimension of the rods. The pitch of the rods can be simultaneously changed. A desired spacing between the rods of a second cooking grate, also supported by the frame, can be determined and if needed, the pitch can be changed to achieve the desired spacing. The pitch can be simultaneously changed using first and second scissors linkages, the first scissors linkage operably coupling a first row of rod ends, and the second scissors linkage operably coupling a second row of rod ends.

Other features, aspects and advantages of the present invention can be seen on review the drawings, the detailed description, and the claims which follow.

BRIEF DESCRIPTION OF THE DRAWINGS

FIG. 8 illustrates a through slot in the frame.

FIG. 9 illustrates a U-shaped guide slot in the frame housing a rectangular guide element.

FIG. 10 shows a set of rods adjacent to one another.

FIG. 18A shows the cooking grate of FIG. 16 with the hand tool of FIG. 18 engaging a rod at each end of the cooking grate for moving the cooking grate between the open and closed configurations.

DESCRIPTION OF THE INVENTION

Figure 1:
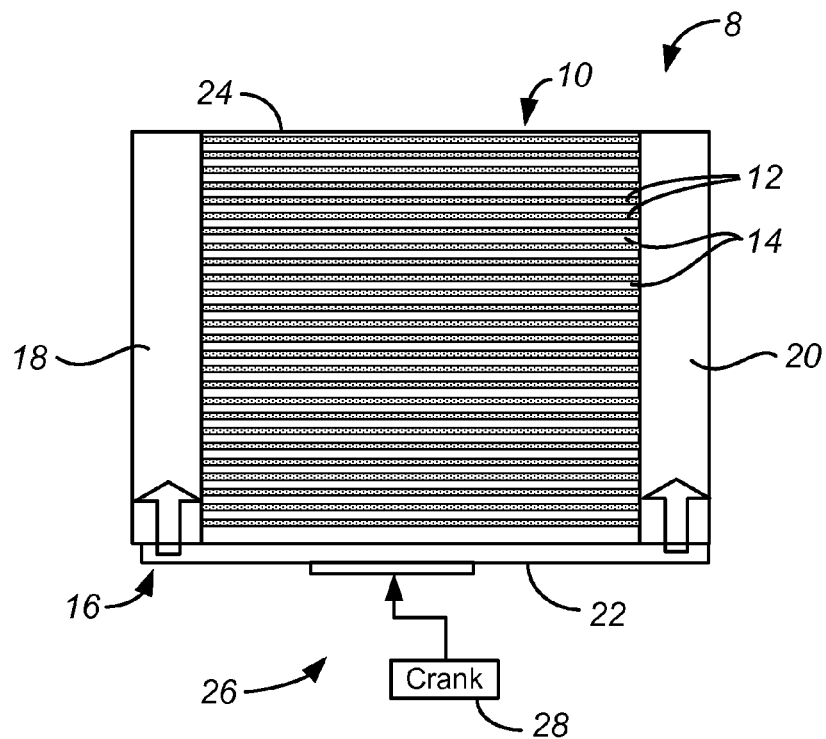
FIG. 1 is a simplified plan view of an example of a cooking grill with the cooking grate in an open configuration.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 is a simplified, schematic representation of one example of a cooking grill 8 including a cooking grate 10 in which the rods 12 are in an open, spaced apart orientation with spaces or gaps 14 therebetween. Rods 12 are sometimes referred to as bars 12. The cooking grill 8 also includes a frame 16 supporting cooking grate 10. Frame 16 includes first and second sides 18, 20 and first and second ends 22, 24 joining the first and second sides. The ends of rods 12, not shown in FIG. 1, are housed within sides 18, 20 which, as discussed in more detail below, guide the rods as they move between the open, spaced apart orientation of FIG. 1 and the closed orientation or arrangement of FIG. 2 with rods 12 adjacent to one another, typically touching one another. In one example rods 12 are biased towards the open orientation of FIG. 1 using compression springs located between adjacent rods 12. One example for doing so as discussed below with starting at FIG. 3. This movement is achieved using a drive assembly 26 including a rotating member, such as a crank 28, to move a movable drive element, such as drive bar 36 discussed below, in the direction of second end 24 causing the rods 12 to be pushed towards the second end 24.

When rods 12 have a flat upper surface, the rods form a substantially flat, griddle-like cooking surface when in a closed configuration. When rods 12 have round or another other than flat upper surfaces, the rods can still create the desired grill marks even when the rods are touching one another. Cooking grill 8 provides several advantages over conventional cooking grills. When the pitch, that is the rod-to-rod spacing, is adjusted so that rods 12 are close to or touching each other, the pre-heating process for the cooking grate 10 will be very fast as the fire and heat can be directly under the rods. This will pre-heat the rods quickly and the operator can adjust pitch as needed during cooking Also, when the flame stays under rods 12, less heat is wasted. This therefore saves fuel, such as charcoal or gas, which is used to heat the rods 12. In addition, conventional non-adjustable cooking grates often require the rods to be covered with aluminum foil or some other metal surface to control heat and flare ups. The cooking grate 10 can eliminate the need for additional materials or surfaces to be placed on top of the cooking grate. This will help control the heat and flames while allowing the spacing of rods 12 to be adjusted as the cooking is in process to allow more or less heat to touch the food.

Cleaning and greasing the upper cooking surfaces of the rods 12 is facilitated by using rods having generally flat upper cooking surfaces and placing rods 12 in the closed arrangement. Cleaning rods on currently available barbecue cooking grates is a challenge because the openings between rods may not allow the brush or other cleaning material to adequately brush and scrap food remains and other cooking residue. The adjustable pitch cooking grate 10 can be easy to clean because the operator can close all the spaces between rods 12 and clean a flat surface easily.

Figure 3:
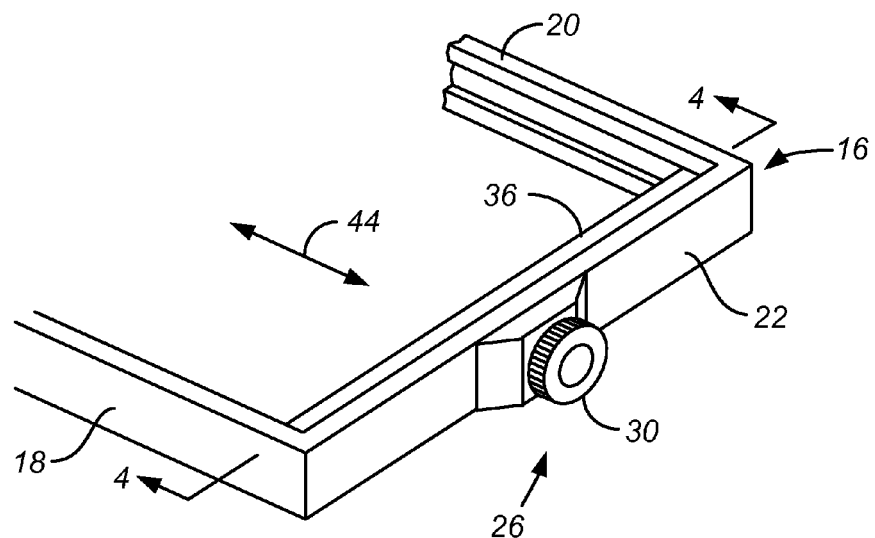
FIG. 3 is a partial overall view of another example of a frame with a drive assembly.
Figure 4:
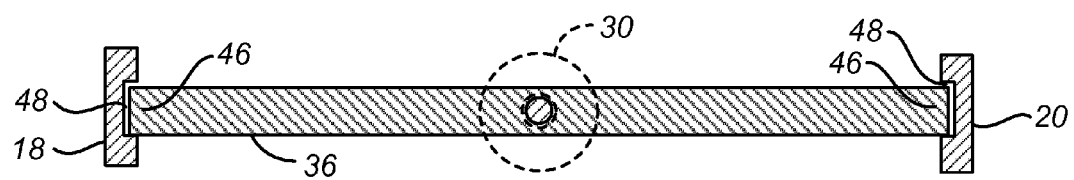
FIG. 4 is a simplified end view of the structure of FIG. 3 with the first end of the frame removed to show the drive bar engaging slots in the sides of the frame.
Figure 5:
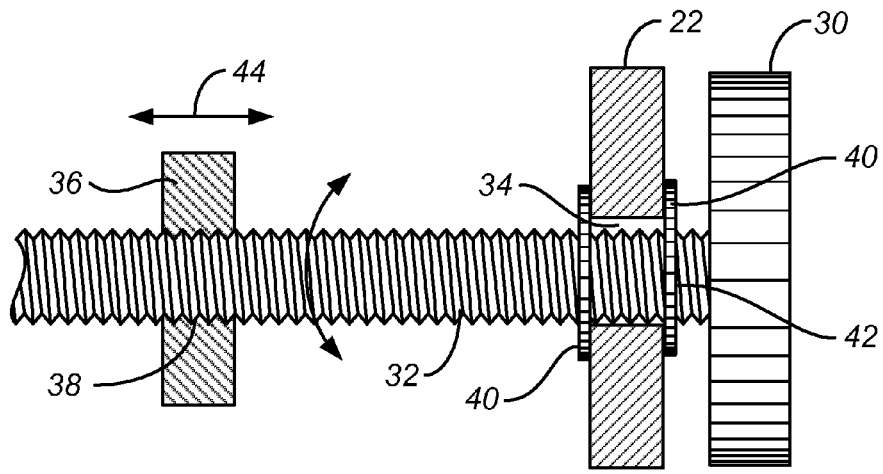
FIG. 5 is a simplified side view showing a drive screw extending from the knob of the drive structure of FIGS. 3 and 4 with the screw passing through the first end of the frame and the drive bar.

FIG. 3 is a partial overall view of another example of a frame 16 with a drive assembly 26 at first end 22 of the frame. Drive assembly 26, see FIGS. 3-7, includes a rotatable knob 30 extending from one end of a drive screw 32 with drive screw 32 passing through a through hole 34 in first end 22 of frame 16. Drive assembly 26 also includes a drive bar 36 having a threaded opening 38 threadably engaged by drive screw 32. The axial position of drive screw 32 relative to first and 22 of frame 16 does not change as knob 30 is rotated by the use of a pair of snap rings 40 engaging grooves 42 formed in drive screw 32. However, rotating knob 30 causes drive bar 36 to move in the direction of arrow 44, that is between first and second ends 22, 24. The outer ends 46 of drive bar 36 are guided within U-shaped slots 48 at the ends of first and second sides 18, 20 adjacent to first end 22. In some examples knob 30 can be an electric motor 30 used to automatically rotate drive screw 32. Electric motor 30 can be manually adjusted and controlled or remotely adjusted in control, through either wireless or wired means. The remote adjustment and control can be through the use of computer-based devices, such as pad computers and what are commonly referred to as smart phones.

Referring now to FIGS. 9-15, first and second sides 18, 20 have slots 50 extending along substantially their entire lengths, slots 50 acting as first guide elements. In the example of FIG. 8, slots 50 extends completely through a sidewall of first side 18 while in the FIG. 9 example, slot 50 extends only part way through second side 20. Rods 12 have rectangular extensions 52 acting as second guide elements at either end. This permits rods 12 to move within frame 16 between first and second sides 18, 20 while maintaining a desired height for uniform upper surface. The engagement of rectangular extensions 52 within slots 50 also helps to prevent rods 12 from rotating about their axes. This is important because rods 12 also have spring recesses 54, not visible in FIG. 10, near each end with a spring recess of one rod opposite the spring recess of its adjacent rod. In this example the spring recesses are slots for housing flat springs 56 so that the springs can be fully housed within spring recesses 54 when rods 12 are touching one another. Other types of springs, such as coiled compression springs can be used within a suitably shaped and sized opening formed in rods 12.

Figure 2:
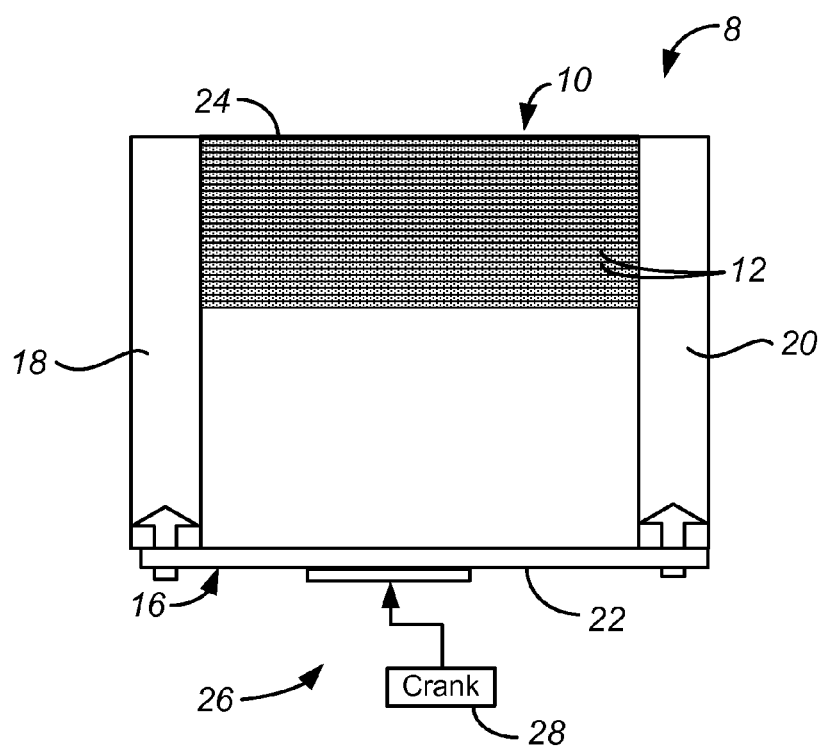
FIG. 2 is a view similar to that of FIG. 1 with the cooking grate in a closed configuration.
Figure 6:
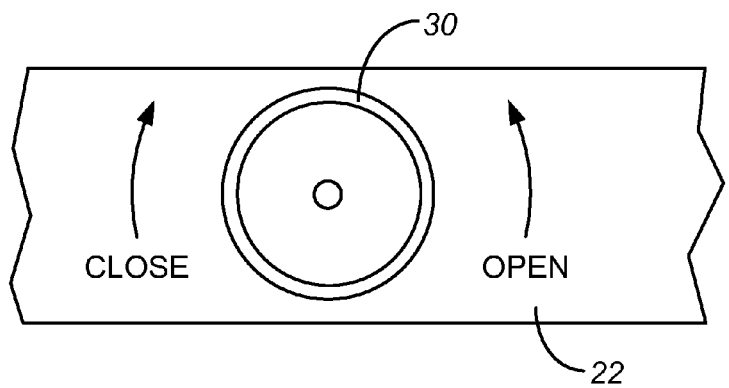
FIG. 6 labels the directions of rotation of the knob of FIG. 3-5.
Figure 7:
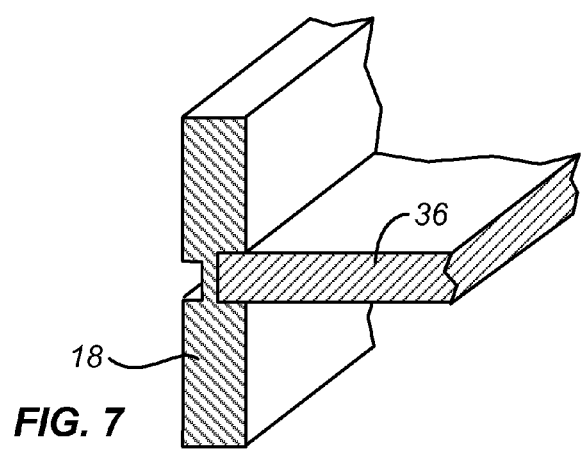
FIG. 7 shows the engagement of one edge of the drive bar of FIGS. 3-5 engaging a slot in a side of the frame.
Figure 11:
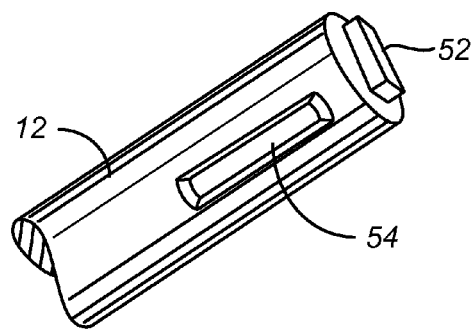
FIG. 11 shows a cylindrical rod having a spring recess adjacent to one end.
Figure 12:
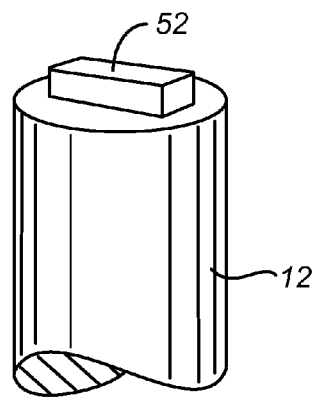
FIG. 12 shows the rod having an oval cross-sectional shape with a rectangular second guide element extending from the end.
Figure 13:
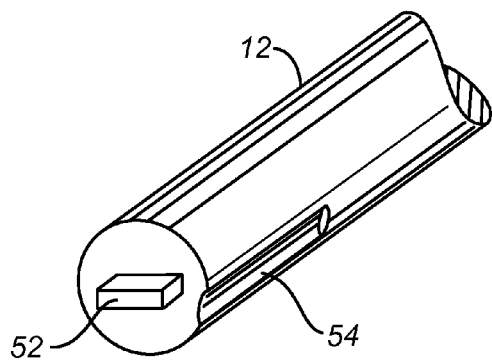
FIG. 13 shows structure similar to that of FIG. 12 but in which the rod has a circular cross-sectional shape.
Figure 14:
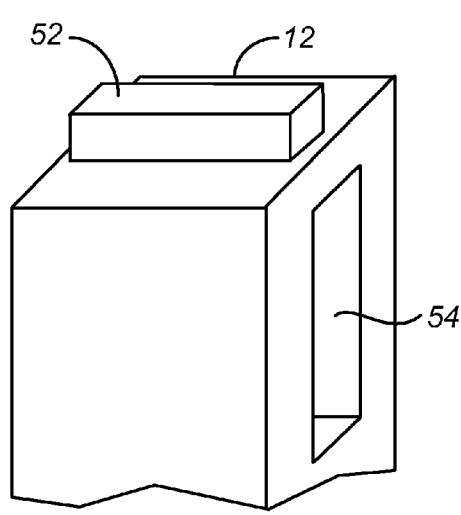
FIG. 14 shows a rod similar to that of 9-13 but with the rod having a rectangular cross-sectional shape.
Figure 15:
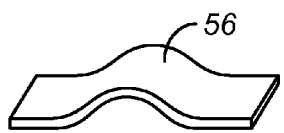
FIG. 15 is an overall view showing a flat spring such as is mountable within the spring recesses shown in FIGS. 11, 13 and 14.

To prepare for cooking, cooking grate 10 is typically placed in the closed orientation of FIG. 2. This permits rods 12 to heat up relatively quickly. Assuming cooking grate 10 is in the open orientation of FIG. 1, knob 30 is rotated in the close direction as shown in FIG. 6 causing drive bar 36 to be moved towards second end 24. This causes drive bar 36 to push against the rod 12 closest to the first end 22. Because all of the rods 12 are operably coupled to one another through springs 56, movement of the first rod 12 will cause similar movement of the remaining rods 12, subject to frictional forces. To compensate for frictional forces, the stiffness of springs 56 can be made to decrease moving from first end 22 to second end 24. Other means for accomplishing generally equal movement of rods 12 can also be used. In other examples it may be desired to allow the rods 12 towards the first end 22 to be forced against one another while the rods 12 at second end 24 are still spaced apart from one another. In other examples other structure and techniques for moving rods 12 between the open orientation and closed arrangement of FIGS. 1 and 2, with or without springs, can also be used. After the preheating of cooking grate 10, knob 30 is rotated in the open direction to permit desired amount of space between rods 12. In some situations it may be desired to begin cooking with rods 12 in the closed orientation of FIG. 2 and after initial period of cooking, knob 30 can be rotated to create the desired degree of space between rods 12. The size of spaces 14 between rods 12 during cooking can be at easily adjusted to accommodate the type of food being cooked, such as large spaces for steaks, medium spaces for hamburger and small or no spaces for fish.

In addition to slots 50 providing second guide elements, first and second sides 18, 20 also act to cover up the outer ends of rods 12 to help keep food and other debris from accumulating around the first and second guide elements, spring recesses 54 and springs 56. In some examples springs can be used to maintain rods 12 in a closed arrangement and a suitably constructed drive assembly can be used to move rods 12 to the open orientation of FIG. 1. Also, drive assembly 26 could include separate rotatable drives, one at each end of first and 22.

Figure 16:
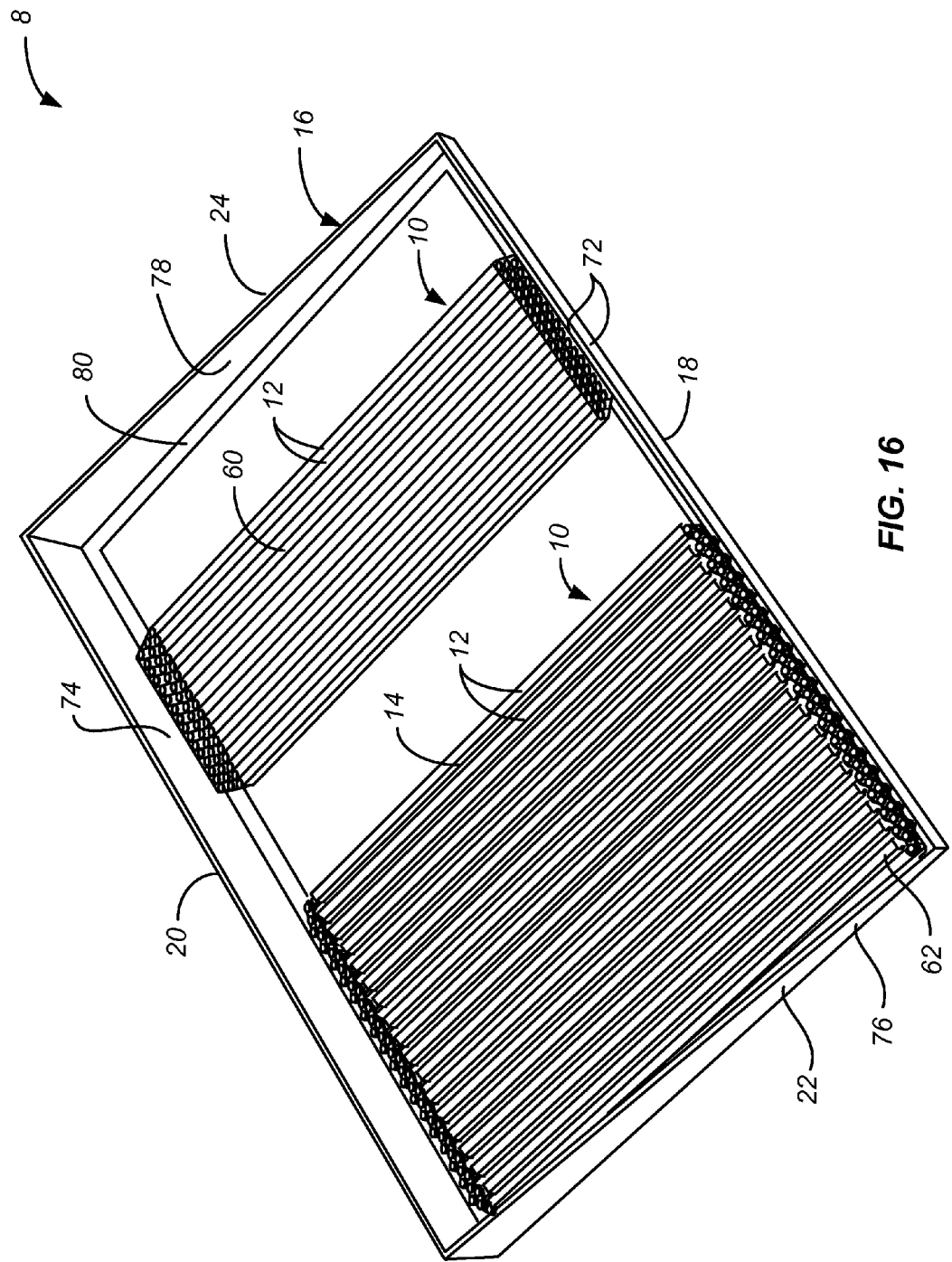
FIG. 16 is an overall view of another example of a cooking grill showing a first cooking grate in an open configuration and a second cooking grate in a closed configuration.

FIG. 16 illustrates another example of cooking grill 8. In this example frame 16 is sized to support two cooking grates 10. Cooking grate 10 on the left in FIG. 16 is shown in an open configuration with rods 12 displaying a pitch 13 and spaced apart from one another to create spaces 14 therebetween. In the example of FIG. 16 rods 12 have a rectangular cross-sectional shape, typically square, so that when cooking grate 10 is in the closed configuration, a generally flat, generally smooth, generally continuous cooking surface 60 is created. In one example rods 12 have a square cross-sectional shape with a dimension of about 1.3 cm on each side and lengths of about 45 cm. The pitch 13, that is the centerline to centerline distance between rods 12, can in some examples vary between about 1.3 cm and 5.0 cm. Therefore, these examples the space 14 between rods 12 can vary from no space between rods 12 in the closed configuration in the example on the right-hand side of FIG. 16 and about 3.8 cm, that is about three times the lateral dimension of rods 12, in the open configuration in the example on the left-hand side of FIG. 16. The maximum space 14 between rods 12 will typically be about equal to the diameter of the rods up to about two times the diameter of the rods, but can be more depending on the cooking environment. In this application the diameter of the rods refers to the lateral dimension of the rods measured perpendicular to their lengths and parallel to the plane defined by cooking grate 10 and is not limited to rods having circular cross-sectional shapes.

Figure 17:
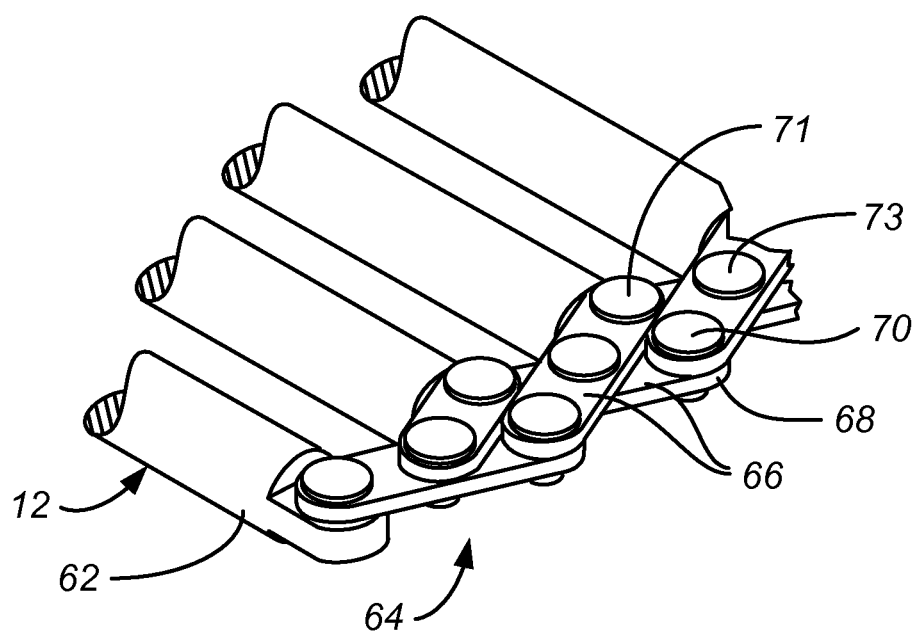
FIG. 17 is an enlarged view of a portion of the end of the first cooking grate of FIG. 16 in the open configuration.
Figure 18:
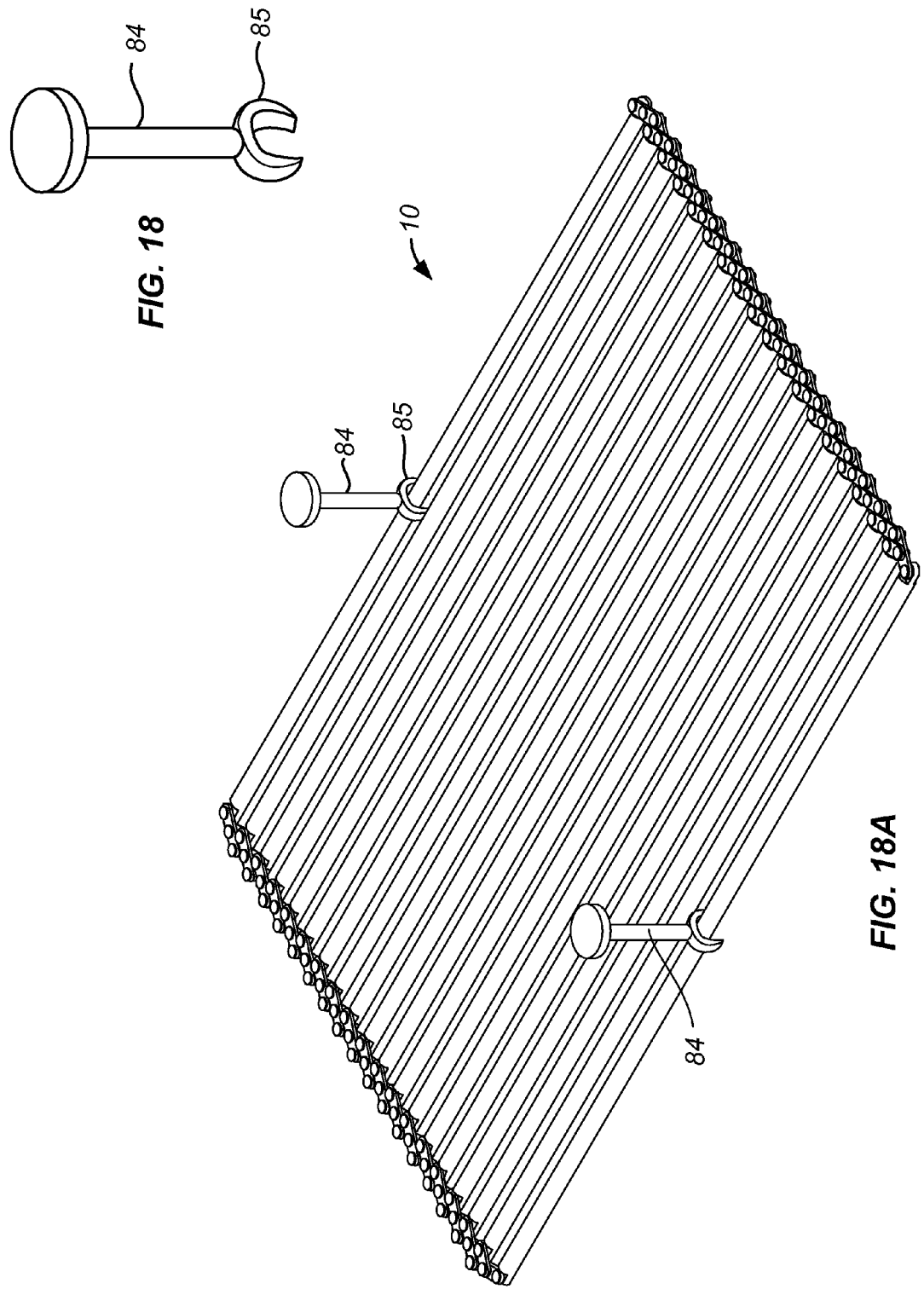
FIG. 18 is shows an example of a simple hand tool used to engage a rod at an end of the cooking grate for moving the cooking grate between open and closed configurations.

The ends 62 of rods 12, see FIG. 17, are joined by a scissors linkage 64, also referred to as a pantograph linkage 64, so that all of rods 12 of cooking grate 10 move between the open and close configurations in unison. Linkage 64 includes links 66 connected to one another at their outer ends 68 by rivets 70 and to outer ends 62 of rods 12 by rivets 71. In addition, rivets 73 secure links 66 to one another where they cross over one another at their central regions. Sleeves may be used with the rivets to ensure smooth operation of linkage 64. In this example all of the components of cooking grate 10 are stainless steel. However, other materials suitable for use in a cooking environment may also be used, such as cast-iron, ceramics or ceramic coated metals. Rods 12 in the example of FIGS. 17 and 18 have a round cross-sectional shape as opposed to the square cross-sectional shape of the example of FIG. 16. Other regular or irregular cross-sectional shapes can also be used for rods 12.

Frame 16 in the example of FIG. 16 has sidewalls 72, 74, 76, and 78, corresponding to first side 18, second side 20, first end 22, and second end 24. Sidewalls 72-78 extend upwardly from a generally horizontally extending lip 80. Sidewalls 76, 78 increase in height from sidewall 72 to sidewall 74. The provision of lower sidewall 72 facilitates access to cooking grates 10 by a user positioned at the first side 18. The size of lip 80 is sufficient to support the ends of cooking grates 10 at linkage 64 in both of the open and close configurations.

Figure 19:
FIG. 19 shows another example of a tool, similar to the tool of FIG. 18, used to engage a rod at an end of the cooking grate.
Figure 19A:
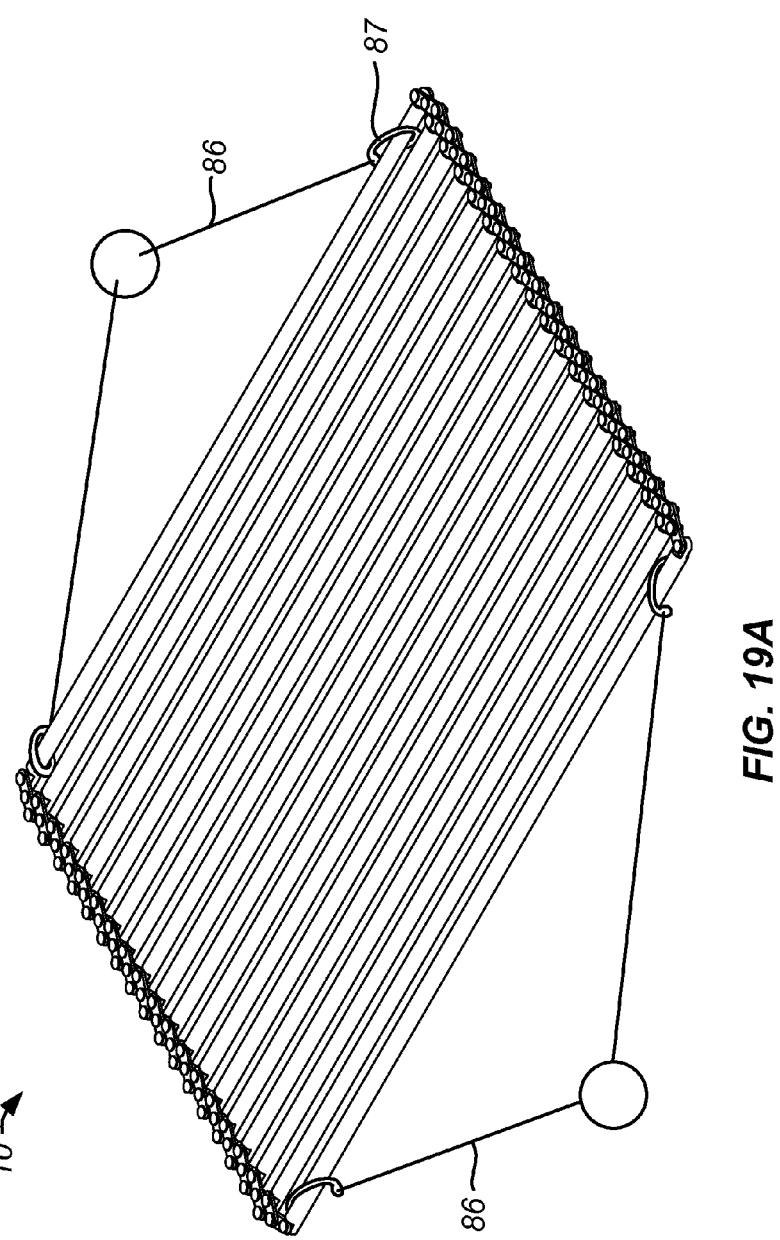
FIG. 19A is a view similar to that of FIG. 18A but using the tool of FIG. 19 to engage a rod at each end of the cooking grate.
Figure 20:
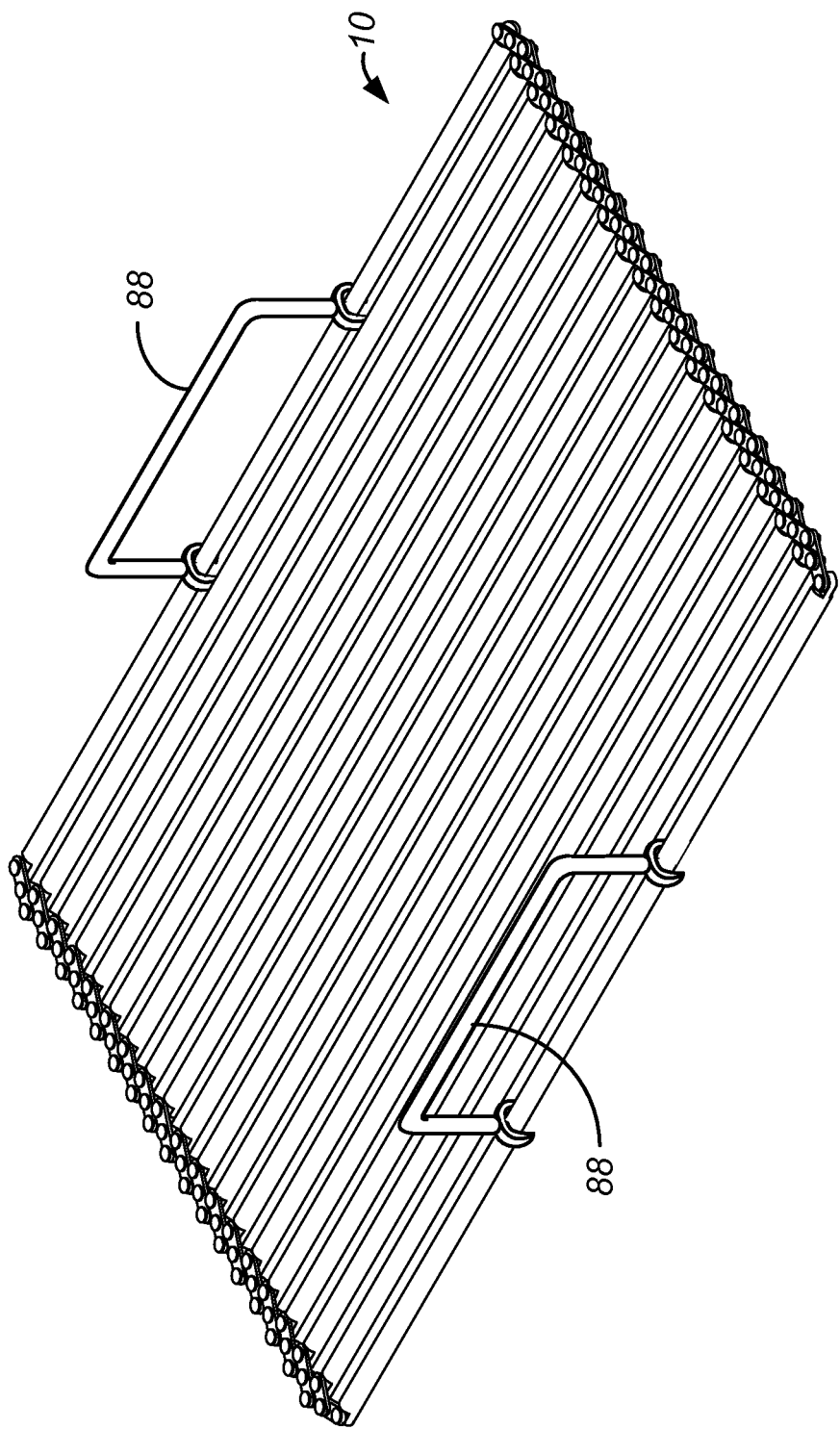
FIG. 20 is a view similar to that of FIG. 18A in which a handle is mounted to and extends from central positions along the rods at each end of the cooking grate for moving the cooking grate between the open and closed configurations.

The manipulation of cooking grate 10 between the open and closed configurations can be accomplished in different ways. One way of accomplishing this in the example of FIG. 16 can be by the use of a tool, such as tool 84 of FIG. 18 or tool 86 of FIG. 19, having ends 85 or 87 configured to engage rod 12 at each end of cooking grate 10. After ends 85 or 87 having positioned to engage rods 12, then the tools are separated causing the rods 12 at each end to separate so that the cooking grate moves to a desired partially open configuration or a fully open configuration. Cooking grate 10 can be placed in the closed configuration from a partially or fully open configuration by forcing the rods 12 at each end toward one another, typically using some type of tool for safety. Alternatively, handles 88, see FIG. 20, can be made to extend from the rods 12 at each end of cooking grate 10 to facilitate moving cooking grate 10 between the open and closed configurations. In some examples one end of cooking grate 10 could be secured to frame 16 so that movement between the open and closed configurations can be accomplished moving the rod 12 at the opposite end of the cooking grate.

Cooking grate 10, with or without frame 16, can be an integral component of a fixed or a movable cooking facility, such as barbecue grills and barbecue islands in both home and commercial kitchens. Cooking grate 10, with or without frame 16, can be, for example, supported by the heated cooking surface of a conventional fixed or movable cooking facility.

Figure 21:
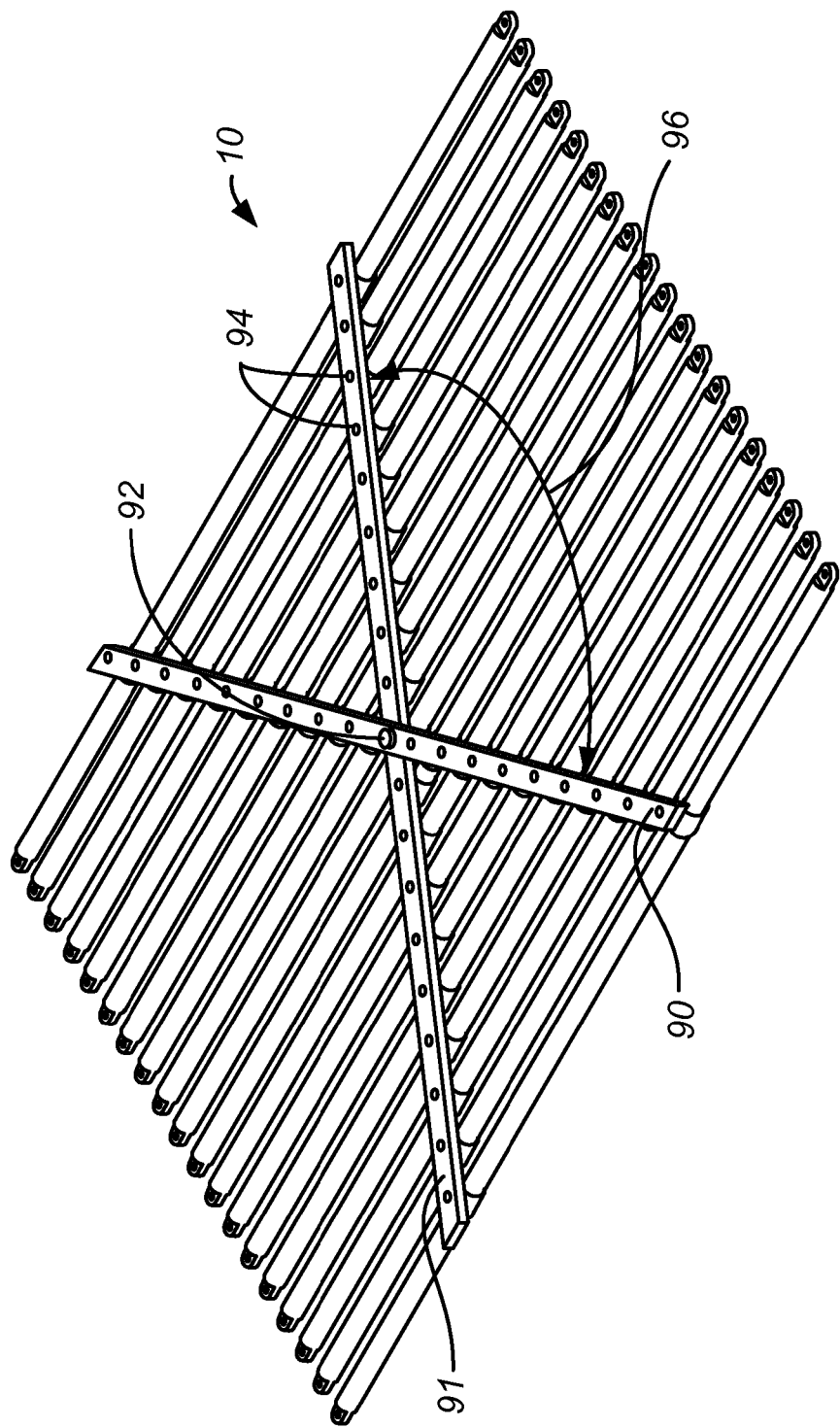
FIG. 21 shows an alternative example to the scissors linkage of FIG. 17 used to allow the rods to be simultaneously between the open and closed configurations.

The rods 12 in the example of FIGS. 16 and 17 made to move in unison through the use of the scissors linkage 64. Other ways of moving rods 12 in unison can be devised. For example, two relatively long arms 90, 91, see FIG. 21, can be secured to one another at a pivot point 92 at their centers so that they form an X. Sliders 94 are positioned at fixed locations along each rod and slidably engage rods 12. Changing the angle 96 between arms 90, 91 will cause pitch 13 to change as cooking grate 10 moves between open and closed configurations. In the closed configuration angle 96 will be a minimum.

Figure 22:
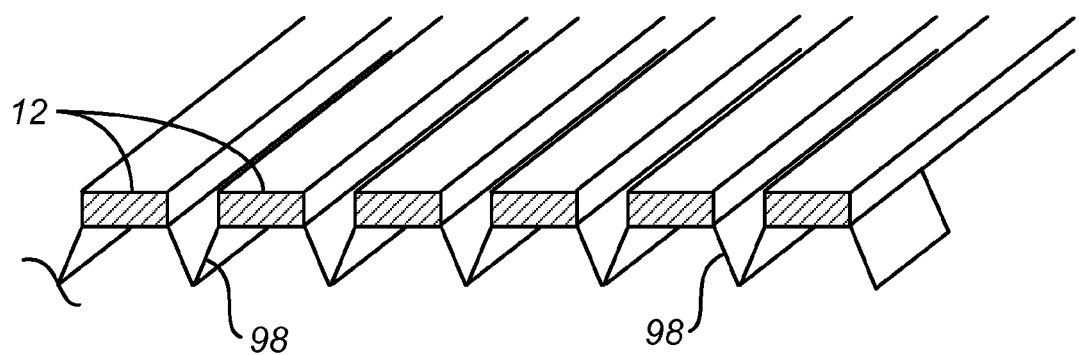
FIG. 22 illustrates the use of V-shaped members connecting the ends of the rods along each side with the cooking grate in the open configuration.
Figure 23:
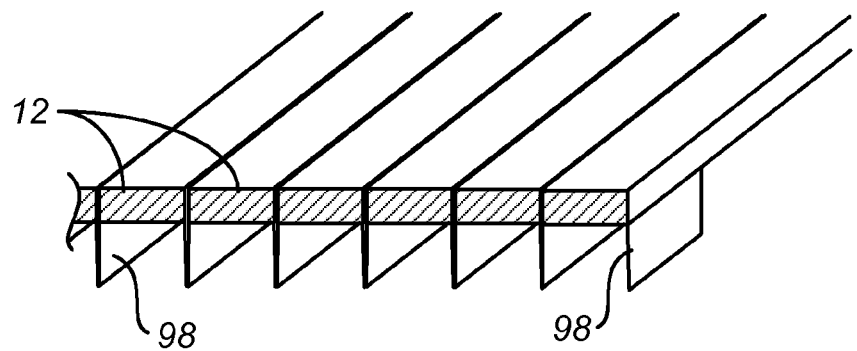
FIG. 23 illustrates the structure of FIG. 22 with the cooking grate in the closed configuration.

The examples of FIGS. 1-15 commonly use various types of spring arrangements between rods 12 to cause the rods 12 of cooking grate 10 to move between the open and closed configurations. Instead of placing springs between rods 12, the ends of the rods along first and second sides 18, 20 can be secured to one another by, for example, folded V-shaped members 98 as shown in FIG. 22 which collapse into a flattened configuration when moved from the open configuration of FIG. 22 to the closed configuration of FIG. 23. If members 98 are not made of spring material, cooking grate 10 will be placeable primarily in a constant-pitch fully open configuration or a constant-pitch fully closed configuration. If members 98 are made of spring material, then intermediate, generally constant-pitch open configurations are possible.

One of the advantages of cooking grate 10 arises when rods 12 have a flat upper surface. When rods 12 have a flat upper surface, in the closed configuration the rods form a generally flat, generally smooth, generally continuous, griddle-like cooking surface. When rods 12 have a flat upper surface, the upper surfaces form a plurality of generally flat, coplanar, spaced apart cooking surfaces when the rods are in a range of open configurations from just barely open, with small spaces 14 therebetween, to fully open with the maximum-sized spaces 14 therebetween. This helps to ensure that the maximum support surface area is provided by rods 12 regardless of the spaces 14 between rods 12. This is very important when cooking delicate foods, such as many fish. This is ability to maximize the horizontal cooking surface is in contrast with some conventional grates in which the rods are rotated to change the gaps between the rods, not the rod pitch, causing edges of the rods to act as the cooking support surface.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, cooking grill 8 can be made to be a collapsible structure.

Any and all patents, patent applications and printed publications referred to above are incorporated by reference.

What is claimed is:

1. An adjustable pitch cooking grate comprising:
a plurality of parallel rods having first and second rows of rod ends;
first and second scissors linkage operably coupling the first and second rows of rod ends;
each of the first and second scissors linkage comprising links pivotally secured to one another and to the rod ends;
each of the first and second scissors linkage placeable in a first orientation causing the rods to be placed in a closed configuration with the rods at a first pitch and adjacent to one another;
each of the first and second scissors linkage placeable in a plurality of second orientations causing the rods to be placed in a plurality of open configurations at a plurality of pitches, the rods defining a plurality of different width gaps between the rods in the plurality of open configurations;
each scissors linkage having a first length when in the first orientation and a plurality of different second lengths when in the plurality of second orientations, the first length being shorter than the second lengths.

2. The adjustable pitch cooking grate according to claim 1, further comprising a rod movement tool engageable with first and second of the rods for manually changing the pitch between the first and second rods so that the first and second scissors linkage changes the pitch between the remainder of said parallel rods.

3. The adjustable pitch cooking grate according to claim 2, wherein the rod movement tool is a manually operated tool.

4. The adjustable pitch cooking grate according to claim 1, wherein the first and second scissors linkages are configured to move the rods between the closed configuration and the plurality of open configurations in unison.

5. The adjustable pitch cooking grate according to claim 1, wherein the rods have a rectangular cross-sectional shape.

6. The adjustable pitch cooking grate according to claim 1, wherein when the rods have flat upper surfaces so that the rods create a flat, smooth, continuous cooking surface when in the closed configuration and a plurality of generally flat coplanar cooking surfaces when in the plurality of open configurations.

7. The adjustable pitch cooking grate according to claim 1, wherein:
the rods have a lateral dimension; and
the spacing between the rods in a fully open configuration is about equal to 1 to 3 times the lateral dimension of the rods.

8. The adjustable pitch cooking grate according to claim 1, wherein the rods are placeable in unison into the plurality of open configurations and into the closed configuration by the first and second scissors linkage.

9. The adjustable pitch cooking grate according to claim 1, wherein the plurality of open configurations defines a continuous range of different width gaps.

10. A cooking grill comprising:
an adjustable pitch cooking grate according to claim 1; and
a frame supporting the adjustable pitch cooking grate.

11. The cooking grill according to claim 10, further comprising a second adjustable pitch cooking grate according to claim 1.

12. The cooking grill according to claim 10, wherein the frame is a rectangular frame having first, second, third and fourth upwardly extending sidewalls and a horizontal lip extending inwardly from the sidewalls, the lip supporting the first and second rows of rod ends.

13. The cooking grill according to claim 10, wherein:
the frame has first and second sides, a first frame end and a second frame end;
each side comprising a first guide element extending along the sides; and
each rod comprising a second guide element at the rod ends, the rods extending between the first and second sides with the second guide elements engaging the first guide elements for at least limited movement along a path between the first and second frame ends.

14. The cooking grill according to claim 10, wherein:
the rods have ends forming said first and second rows of rod ends; and
the frame has slots for receiving the first and second rows of rod ends.

15. A cooking grill comprising:
an adjustable pitch cooking grate;

a frame having first and second ends and supporting the adjustable pitch cooking grate between the first and second ends;
a rod drive assembly;
the adjustable pitch cooking grate comprising:
 a plurality of parallel rods including a first rod at one end of the plurality of parallel rods; and
 spring elements operably coupling adjacent ones of the rods, the spring elements either:
  biasing the rods towards one another; or
  biasing the rods away from one another; and
the rod drive assembly comprising a movable drive element engageable with the adjustable pitch cooking grate, the movable drive element coupled to and movable with the first rod towards an end of the frame against the biasing force of the spring elements.

16. The cooking grill according to claim 15, wherein the rod drive assembly further comprises a driver supported by the frame and operably connected to the drive element to move the drive element in a chosen direction thereby causing said movement of the first rod.

17. The cooking grill according to claim 16, wherein the driver comprises an electric motor.

* * * * *